Jan. 15, 1935. O. N. KOMPERUD 1,988,386
KNIFE
Filed May 18, 1933
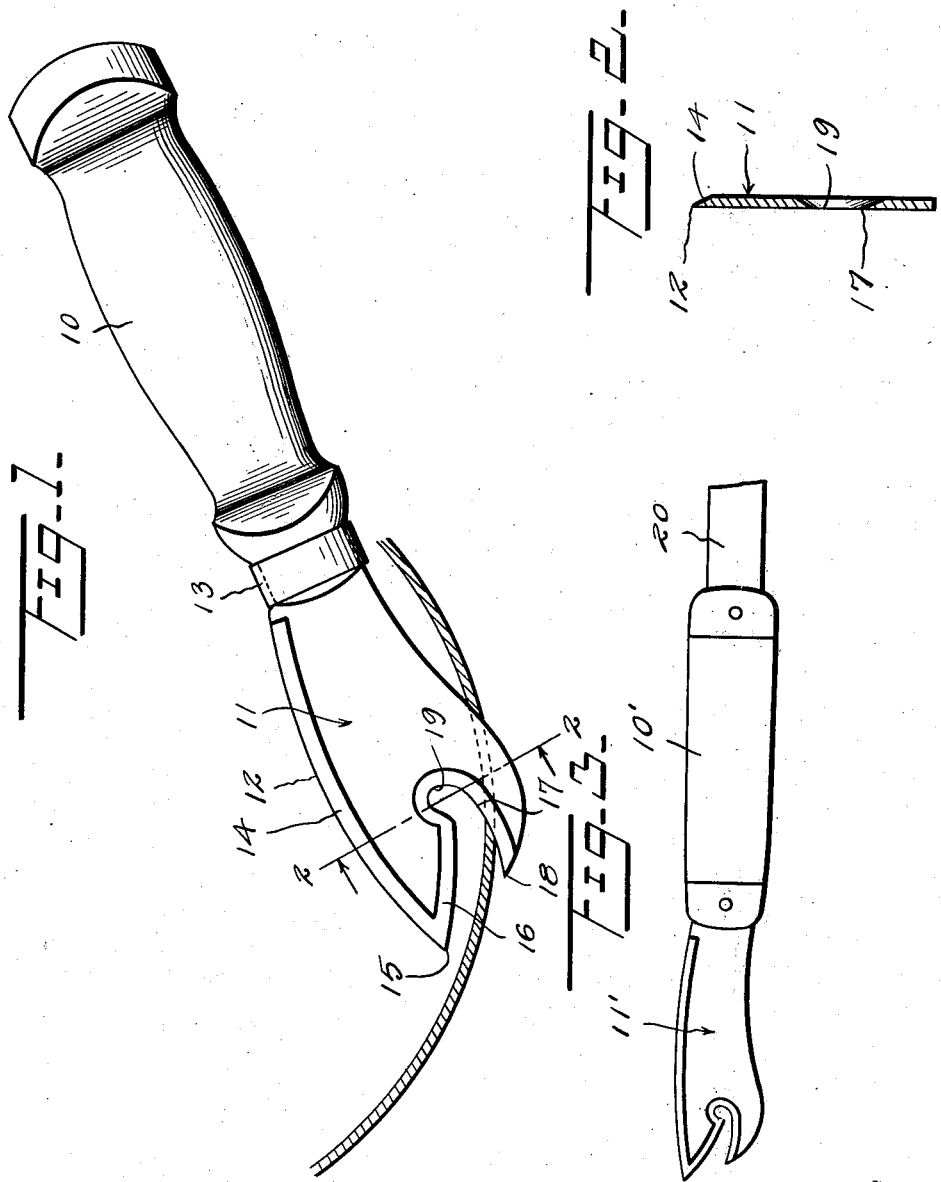
Inventor
O. N. Komperud
By Watson E. Coleman
Attorney Patented Jan. 15, 1935

1,988,386

UNITED STATES PATENT OFFICE 1,988,386

KNIFE

Ole N. Komperud, Minneapolis, Minn.

Application May 18, 1933, Serial No. 671,751

1 Claim. (Cl. 17—1)

This invention relates to knives and more particularly to a knife adapted for use in the dressing or cutting up of fish, game or the like.

An object of this invention is to provide a knife which is constructed to facilitate the cleaning of a fish and which embodies means whereby a fish or other animal can be easily skinned.

Another object of this invention is to provide a knife which is constructed so that articles having a concave surface may be worked upon, and the knife includes means whereby the concave portion of the articles will not clog in the forward end of the knife.

The above and various other objects and advantages of this invention will in part be described and in part be understood from the following detailed description of the present preferred embodiment, the same being illustrated in the accompanying drawing wherein:—

Figure 1 is a detail side elevation of a knife constructed according to the preferred embodiment of this invention showing the use of the knife with a concave article.

Figure 2 is a sectional view taken on the line 2—2 of Figure 1.

Figure 3 is a detail side elevation of a modified form of this device.

Referring to the drawing wherein like numerals of reference designate corresponding parts throughout the views, the numeral 10 designates generally a handle which is cut out to snugly engage a hand. A cutting blade, generally designated as 11, is secured to the forward end of the handle 10, and a ferrule 13 engages about the forward end of the handle 10 and acts to prevent splitting of the forward portion of the handle.

This blade 11 is constructed of a flat piece of metal having one cutting edge 12 constructed on a longitudinal curvature and the keen edge of the blade 11 is formed by beveling one side of the blade 11, as at 14, whereas the opposite side of the blade 11 is flat. The blade 11 is provided with a forward point 15 and a second cutting edge 16 extending rearwardly from the point 15.

A third cutting edge 17 is formed by cutting out a portion of the blade 11 between the point 15 and the back of the blade so as to provide a second point 18 and substantially confronting cutting edges 16 and 17. This cutting edge 17 is constructed on a curvature opposed to the curvature of the cutting edge 12, and this knife portion 17 terminates in a rounded cutting portion 19 at the junction between the cutting edge 17 and the cutting edge 16. The point 18 and the cutting edge 17 are constructed to project in the direction of the point 15 and in such a position that when the blade 11 is reversed and the point 18 projected into a member, the blade may be pushed forwardly through the member with the keen edge 17 cutting the material, and any material that is not readily cut will back up into the terminus 19 of the cutting edge 17 and be cut in this inner cutting portion 19. When the blade 11 is reversed so as to use the cutting edge 17, the blade is held with the point 15 out of contact with the material.

As shown in Figure 3, the blade 11' is constructed in the same manner as the blade 11, but the handle 10' is the handle of a conventional knife structure wherein the blades are foldable into the body of the handle. This handle 10', as shown in the drawing, may have additional blades such as blade 20 projecting in a direction opposite from the blade 11'.

In the use of this device, the convex keen edge 12 is constructed to cut any rounded or convex surfaces or flat surfaces, and where the knife is used for cleaning of fish or skinning animals, the skin may be readily cut by the cutting edge 12. Where an article or member having a concave face is to be cut, the blade 11 is reversed and the point 18 projected through the article, as where the article is a fish or the skin of an animal, the blade 11 may, after having the point 18 projected through the article, be pushed forwardly with the concave cutting edge 17 splitting the article and, in this position, the point 15 will be disposed out of engagement with the concave surface of the article. Preferably, the blade 11 is made relatively heavy so that the different members of the fish may be severed, but the cutting edge 12 and the cutting edge 17 may be used for cutting or severing members of the fish within the body.

What is claimed is:—

A knife as set forth comprising a handle, a blade secured to the handle, said blade comprising a relatively flat body having a keen convex edge on one edge thereof, said keen edge terminating in a relatively sharp V-shaped point at the forward end of the blade, said point having a keen edge on each side edge thereof, a second cutting member integral with the body and offset from said point, said second cutting member having a concave cutting edge along one edge thereof terminating in a forwardly projecting point extending in the direction of the first point, said latter point terminating forwardly of the rear end of said V-shaped point.

OLE N. KOMPERUD.